2,843,498
Patented July 15, 1958

2,843,498
PIGMENT COMPOSITION

William S. Struve, Carney's Point, N. J., assignor to E. I. du Pont de Nemours and Company, Wilmington, Del., a corporation of Delaware No Drawing. Application March 23, 1954
Serial No. 418,211

7 Claims. (Cl. 106—288)

This invention relates to pigments which are flocculation resistant, and more particularly to an improved Dioxazine Violet pigment, together with the process of making such pigments.

A pigment comprising 6,13-dichloro-2,9-diphenyl-triphendioxazine is disclosed in British Patent 646,099. This pigment known as Dioxazine Violet is a red shade violet of good light fastness and very high strength. However, due to very severe flocculation in paint systems, it has found no wide field of application.

It is common practice in the manufacture of paints and other coating compositions to mix two or more pigments to obtain desired color effects. The mixture probably found most often is the combination of a major amount of a prime white pigment, such as titanium dioxide, and a small amount of a colored pigment to give a tint or pastel shade. In many cases it has been found that such mixtures give different color values depending upon the method of application, and the behaviour is such as to suggest that the dispersed particles of colored pigment have aggregated or "flocculated." This behaviour has been called "flocculation." It is a reversible phenomenon in that vigorous work on a paint system will restore the original dispersion, such as, for instance, the passage of the paint through the orifice of a spray gun or the work done during application with a brush. If such a paint film dries rapidly as by the evaporation of the solvents from a sprayed lacquer film, there is little opportunity for flocculation to take place and the sprayed film exhibits the desired color. Now, if the same lacquer, after standing, is poured over the top of the sprayed film, the poured portion of the surface may appear weaker than the sprayed portion indicating that flocculation has taken place in the absence of work on the system.

In a film which dries more slowly, such as an enamel film which dries largely by oxidation, there is an appreciable interval after application when the film is sufficiently fluid for flocculation to take place and the color strength may change while the film is drying. Now, if the partially dried film is disturbed, as by brushing over when joining with a newly brushed portion of the paint film or by deliberately rubbing with the finger, the original dispersion may be restored and the rubbed portion of the film will appear stronger than the undisturbed film if flocculation has taken place.

These two manifestations of the reversible phenomenon are often used as testing methods for the flocculation of pigments. Methods for overcoming flocculation have also been proposed and demonstrated by such tests to be successful in some cases. Thus, for instance, copper phthalocyanine pigments have been serious offenders with respect to flocculation and it has been proposed in U. S. 2,327,472 to prepare lakes of copper phthalocyanine containing about 50% aluminum benzoate and such products are found to be flocculation resistant. However, the aluminum benzoate treatment is much less effective in preventing flocculation of dioxazine pigments and no method has been known heretofore for satisfactorily overcoming this defect in dioxazine pigments.

Now, it has been found that the treatment of a dioxazine pigment with a minor amount of an insoluble metal salt of a dioxazine pigment containing one or more carboxy or sulfonic acid groups confers upon the pigment marked resistance to flocculation in paint systems.

More particularly, it has been found that, if the 6,13-dichloro-2,9-diphenyltriphendioxazine or its dichloro or dibromo substitution products of the formula

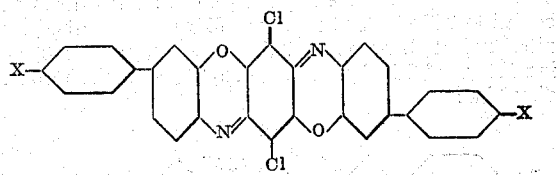

where X=Br, Cl, is treated with 3.5–25% of the aluminum salt of a mono or dicarboxy-6,13-dichloro-2,9-diphenyltriphendioxazine or a 6,13-dichloro-2,9-diphenyltriphendioxazine polysulfonic acid, the resulting products are similar tinctorially to the untreated products and show excellent resistance to flocculation in various paint systems.

These products were made by slurrying the pigment with the required amount of sodium dioxazine carboxylate or sulfonate and precipitating with aluminum sulfate.

Example 1

To a mixture of 162 g. of 4'-chloro-4-amino-biphenyl (Gelmo, Ber., 39, 4176), 52 g. of sodium bicarbonate, 1000 cc. of isopropanol and 100 cc. of water at 50° C. was added over 30 minutes a slurry of 98 g. of chloranil in 100 cc. of water and 400 cc. of isopropanol. The charge was refluxed for 2 hours and cooled to 30° C. The solid was filtered from the slurry, washed chloride-free with water, and dried, giving 219 g. of 2,5-di-(4'-chloroxenylamino)-3,6-dichloroquinone.

A mixture of 150 g. of the above 2,5-di(4'-chloroxenylamino)-3,6-dichloroquinone, 400 cc. of dry nitrobenzene, 21 g. of phosphorus pentachloride, and 10 cc. of benzoyl chloride was heated at 200–205° C. for 8 hours. The cooled reaction mixture was filtered and the cake was washed with benzene and alcohol, and dried giving 64 g. of 2,9-di-p.chlorophenyl-6,13-dichlorotriphendioxazine:

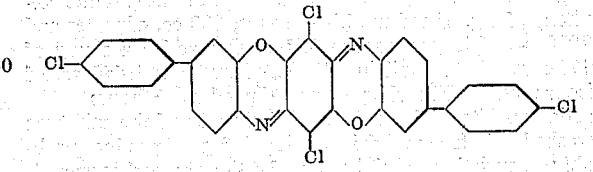

A mixture of 50 g. of the above color and 450 g. of common salt was milled for 72 hours with 4500 g. of ½" steel balls as described in U. S. 2,402,167. The balls were separated and the color-salt mixture was slurried for 1 hour in 5 liters of water and 60 cc. of 37% hydrochloric acid at 60–70° C. The color was filtered off and washed chloride-free. When dried and pulverized, there results a pigment with a very desirable violet hue, excellent strength and supetriod lightfastness. It is particularly desirable as a pigment for blending with copper phthalocyanine to impart a reddish shade without detracting from the superior strength, lightfastness, intensity and general resistance to chemical agents characteristic of the phthalocyanine pigments. However, in spite of these desirable properties, the product of this example has found no wide acceptance for these uses because of its severe tendency toward flocculation when mixed with other pigments.

Example II

To a mixture of 353.5 g. of 4-amino-4'-bromo-biphenyl (Gelmo, Ber., 39,4177), 96.5 g. of sodium bicarbonate, 2300 cc. of isopropanol, and 200 cc. of water at 50° C. was added over 10 minutes a slurry of 176 g. of chloranil, 700 cc. of isopropanol and 160 cc. of water. The charge was heated at reflux for 2 hours and cooled. The solid was filtered off, washed chloride-free with water and dried, giving 455 g. of 2,5-di-p-bromoxenylamino-3,6-dichloroquinone.

A mixture of 450 g. of the above 2,5-di-p-bromoxenyl-amino-3,6-dichloroquinone, 63 g. of phosphorus pentachloride, 30 cc. of benzoyl chloride and 1500 cc. of dry nitrobenzene was heated at 200–205° C. for 8 hours and cooled to 70° C. The solid was filtered off, washed with nitrobenzene, benzene, and then alcohol, and dried, giving 169 g. of 2,9-di-p.-bromophenyl-6,13-dichlorotriphendioxazine:

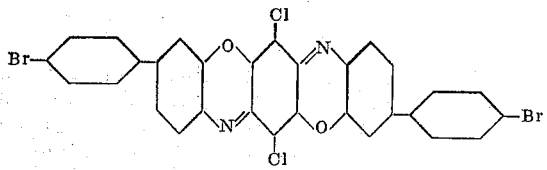

The material was milled with salt as described in Example I to convert it into pigmentary form with substantially the same properties as the pigment of Example I.

Example III

A mixture of 600 g. of 4'-nitrobiphenyl-4-carboxylic acid (U. S. 2,567,126) and 8100 cc. of methanol saturated with hydrogen chloride was refluxed for 16 hours. The solid was filtered from the cooled reaction mass and washed with cold methanol. The cake was slurried in sodium carbonate solution to remove any free acid, filtered, washed and dried. The crude methyl 4'-nitrobiphenyl-carboxylate (525 g.), was recrystallized from benzene; M. P. 189–191° C. Analysis. — Calc'd for $C_{14}H_{11}NO_4$: N=5.45%. Found: N=5.18; 5.36%.

A mixture of 465 g. of the above methyl 4'-nitrobiphenyl-4'-carboxylate and 4000 cc. of methanol was hydrogenated in the presence of 25 g. of palladium charcoal catalyst at 70–80° C. and 400–500# hydrogen pressure. The catalyst was separated and the methyl 4'-aminobiphenyl-4-carboxylate was isolated; M. P. 178–180° C. Analysis.—Calc'd for $C_{14}H_{13}NO_2$: N=5.91%. Found: N=5.91; 6.13%.

To a mixture of 159 g. of the above methyl 4'-amino-biphenyl-4-carboxylate, 142 g. of 4-amino-4'-chlorobiphenyl, 91 g. of sodium bicarbonate, 100 cc. of water and 7000 cc. of isopropanol at 55° C. was added a slurry of 171.5 g. of chloranil in 175 cc. of water and 650 cc. of isopropanol. The charge was refluxed for 3 hours. The solid was filtered from the cooled charge and the cake was washed acid-free and dried giving 410 g. of product probably consisting mainly of 2-(4'-carbomethoxyxenyl-amino)-5-(4'-chloroexenylamino)-3,6-dichloro-quinone.

A mixture of 400 g. of the above substituted quinone, 1070 cc. of nitrobenzene, 56 g. of phosphorus pentachloride and 26.7 cc. of benzoyl chloride was heated at 200° C. for 8 hours. The charge was cooled to 70° C. and the solid was filtered off, washed with benzene and then 2B alcohol, and dried giving 164 g. of a violet product probably consisting mainly of 2-p-carbomethoxyphenyl-9-p-chlorophenyl-6,13-dichlorotriphendioxazine.

In order to hydrolyse the ester group, 110 g. of the above color was added at 20–25° C. to 560 cc. of 96% sulfuric acid and the mass stirred until solution took place. Then 233 cc. of water was added dropwise below 30° C. and the charge was heated at 95–100° C. for 3 hours. The cooled mass was drowned in ice and water and the solid was filtered off, washed acid-free with water and dried giving 106 g. of product probably consisting mainly of 2-p-carboxyphenyl-9-p-chlorophenyl-6,13-dichlorotriphendioxazine:

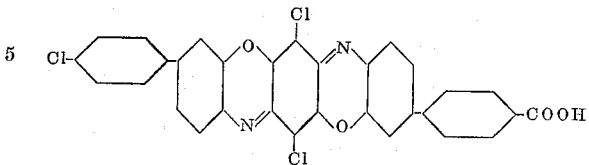

For the purpose of reducing the particle size, 130 g. of the above 2-p-carboxyphenyl-9-p-chlorophenyl-6,13-dichlorotriphendioxazine was dissolved in 1300 cc. of 100% sulfuric acid below 10° C. and the solution was drowned in ice and water. The solid was filtered off and washed acid-free. The cake was partially soluble in dilute sodium carbonate solution. Because of its solubility in alkali, this dioxazine pigment containing one carboxy group required precipitation with a polyvalent metal salt before it becomes useful as a pigment.

Example IV

To a mixture of 159 g. of methyl 4'-aminobiphenyl-carboxylate, 46 g. of sodium bicarbonate, 100 cc. of water and 2000 cc. of isopropanol at 50° C. was added a slurry of 86 g. of chloranil in 100 cc. of water and 400 cc. of isopropanol and the charge was refluxed for 2 hours and then cooled. The solid was filtered off, washed chloride-free and dried, giving 199 g. of 2,5-di-4'-carbomethoxy-xenylamino-3,6-dichloroquinone.

A mixture of 190 g. of the above 2,5-di-4'-carbomethoxyxenylamino-3,6-dichloroquinone, 5% cc. of nitrobenzene, 26.6 g. of phosphorus pentachloride and 12.7 cc. of benzoyl chloride was heated at 200° C. for 8 hours and then cooled to 70° C. The solid was filtered off, washed with benzene and alcohol and dried, giving 119 g. of 2,9-dicarbomethoxyphenyl-6,13-dichlorotriphendioxazine.

110 g. of the above 2,9-dicarbomethoxyphenyl-6,13-dichlorotriphendioxazine was added to 560 cc. of 96% sulfuric acid at 20–25° C. and when the color had gone into solution, 233 cc. of water was added dropwise, keeping the temperature below 30° C. The charge was heated to 95–100° C. and held for three hours. The cooled mass was drowned in ice and water and the solid was filtered off, washed, and dried, giving 100 g. of 2,9-dicarboxyphenyl-6,13-dichlorotriphendioxazine:

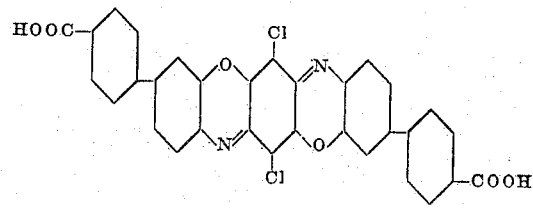

This product dissolved in dilute sodium hydroxide to give a violet solution which may be precipitated as a polyvalent metal salt.

Example V 100 g. of 2,9-diphenyl-6,13-dichlorotriphendioxazine was added to 1080 cc. of 97.8% sulfuric acid and the charge was heated to 45° C. for one hour. At the end of this time a sample gave a clear solution when drowned in a large amount of water. The charge was drowned in ice and water to give 12% sulfuric acid in the drowning liquor. The solid was filtered off, washed acid-free with 5% sodium chloride solution and held as a cake. The cake was completely soluble in water but can be precipitated as a polyvalent metal salt especially the aluminum salt.

Example VI 3 g. of 2,9-dicarboxyphenyl-6-13-dichlorotriphendioxazine (Example IV) was dissolved in 1000 cc. of water and 1.2 cc. of 5 N sodium hydroxide solution. To the solution was added 104.5 g. of a paste containing 27 g. of salt milled 2,9-di-p-chlorophenyl - 6,13 - dichlorotriphendioxazine as prepared in Example I. The mass was stirred to a smooth slurry and then a solution of 6 g. of $$Al_2(SO_4)_3.18H_2O$$

in 100 cc. of water was added dropwise over 10 minutes. After the slurry had been stirred for a further fifteen minutes the color was filtered off, washed sulfate-free and dried, giving 30 g. of product. When ground in a standard automotive alkyd formulation, this product showed practically no flocculation by the spray-pour test while the pigment without the treating agent showed severe flocculation.

*Example VII*

Substitution of 18.6 g. of plup, equivalent to 3 g. dry, of material as prepared in Example III for 3 g. of 2,9-dicarboxyphenyl-6,13-dichlorotriphendioxazine as used in Example VI gave a product showing much less flocculation in alkyd or lacquer formulations than the untreated 2,9-di-p-chlorophenyl-6,13-dichlorotriphendioxazine.

*Example VIII*

6.9 g. of 2,9-di-p-carboxyphenyl-6,13-dichlorotriphendioxazine, as prepared in Example IV was dissolved n 2300 cc. of water and 2.8 cc. of 5 N sodium hydroxide solution. To the solution was added 311 g. of a paste containing 69 g. of salt-milled 2,9-di-p-bromophenyl-6,13-dichlorotriphendioxazine, as prepared in Example II, and the mass was stirred to a smooth slurry. A solution of 13.8 g. of aluminum sulfate ($Al_2(SO_4)_3.18H_2O$) in 230 cc. of water was added dropwise and the slurry stirred a further fifteen minutes. The color was filtered off, washed sulfate-free, and dried. When tested in an automotive alkyd formulation, this product showed practically no flocculation by the spray-pour test while the pigment prepared in Example II without the treating agent showed severe flocculation.

*Example IX*

38 g. of paste containing 5.25 g. of sulfonated 2,9-diphenyl-6,13-dichlorotriphendioxazine as prepared in Example V was dissolved in 1000 cc. of water and 2.1 cc. of 5 N sodium hydroxide solution. 585 g. of paste containing 145 g. of 2,9-diphenyl-6,13-dichlorotriphendioxazine (British Patent 646,099 and salt-milled as described in U. S. Patent 2,402,167) was added and the mass was stirred to a smooth slurry. A solution of 10.5 g. of aluminum sulfate ($Al_2(SO_4)_3.18H_2O$) in 200 cc. of water was added dropwise and stirring was continued for another fifteen minutes. The color, which contains about 4% of the Al salt of the sulfonated dye, was filtered off, washed sulfate-free and dried. When ground in alkyd enamels or nitrocellulose lacquers this product exhibited very little flocculation while the untreated 2,9-diphenyl-6,13-dichlorotriphendioxazine showed severe flocculation. Similarly a sample made to contain 25% of the aluminum salt of sulfonated 2,9-diphenyl-6,13-dichlorotriphendioxazine and 75% of 2,9-diphenyl-6,13-dichlorotriphendioxazine was substantially non-flocculating.

*Example X*

724 g. of paste containing 100 g. of sulfonated 2,9-diphenyl-6,13-dichlorotriphendioxazine as prepared in Example V is dissolved in 5000 cc. of water and 40 cc. of 5 N sodium hydroxide solution. While stirring vigorously at room temperature, a solution of 100 g. of aluminum sulfate ($Al_2(SO_4)_3.18H_2O$) in 2000 cc. of water is added in a period of 5 minutes and stirring continued for 15 minutes. The precipitated aluminum salt is isolated by filtration, washed free of soluble salts, dried and pulverized. The resulting violet powder is valuable for mixing with untreated dioxazine violet as in Example XI.

*Example XI*

A flocculation resistant violet enamel is made by grinding a mixture of about 5% of the aluminum salt pigment of Example X and about 95% of untreated dioxazine violet in a suitable alkyd enamel vehicle. In a typical preparation, the following ingredients are charged to an 8 oz. glass jar containing 400 g. of steel shot.

0.6 gram pigment of Example X
12.4 grams untreated Dioxazine Violet
57 grams long oil alkyd resin 50% solids (GE-2527)
50 grams mineral spirits After grinding about 72 hours, the following ingredients are added:

47 grams alkyd resin (GE-2527)
17 grams mineral spirits
1 gram drier (10% lead-1% cobalt)

After thorough mixing, the enamel is sprayed on to suitable test panels and exhibits substantially no flocculation when tested by either of the methods described above.

The preparation of Diphenyl dichlorotriphendioxazine is already shown in British Patent 646,099 and the preparations of the dichloro- and dibromo-substituted derivatives in Examples I and II are shown for purposes of illustration only and are not intended to be restrictive in any way.

The preparation of the carboxy derivatives is done through the use in the same reaction of a carboxy substituted aminobiphenyl which is usually handled in the form of an ester during the condensation and ring closure steps followed by hydrolysis of the ester as the last step.

The sulfonated derivative is prepared by direct sulfonation but could be prepared through the basic reaction from a sulfonated aminobiphenyl.

Since these products containing the acid substituent groups are soluble in aqueous alkaline solutions, it is necessary that they be precipitated as polyvalent metal salts to become useful as pigments. The aluminum salt is shown as preferred, but other metals, particularly the alkaline earth metals as calcium, barium or strontium, can be used with valuable results. The conditions for precipitating the metal salt are not critical. It is preferred that an alkaline solution of the soluble dioxazine derivative be mixed with a slurry of the untreated pigment followed by the addition of the metal salt solution to precipitate the insoluble polyvalent metal salt (such as aluminum) in the presence of the untreated pigment. However, the aluminum salt of the soluble derivative may be prepared separately and stored as a paste for subsequent mixing with a paste or slurry of the untreated pigment prior to drying. In fact the aluminum salt may also be prepared as a separate dry powder and incorporated into the coating composition by grinding the mixture of the dry aluminum salt of the sulfonated dioxazine violet, for instance, and the untreated pigment together into the vehicle.

The amount of the polyvalent metal salt of the water soluble derivative required for the purposes of this invention may vary over a considerable range. It appears that about 3%, based on the weight of the total pigment, is necessary for any significant advantage to be shown. The examples have in most part illustrated the use of about 10% of the pigment which appears to be an optimum in controlling flocculation without disturbing other properties. On the other hand, larger amounts, up to about 25%, can be used to obtain properties of interest. Since the substituted product is more difficult to manufacture and, hence, more expensive, it is desirable to use the least effective amount for most purposes.

No completely satisfactory explanation of flocculation or of the means of preventing it has been found. It is generally considered that highly dispersed solid particles in a colloidal system, such as most paints and enamels, carry an electrical charge which assists in maintaining the dispersion by the repelling effect of like charges. It is possible that the introduction of a second pigment into the system may disturb the delicate balance of charges and bring about partial flocculation. On the other hand, the treatment of a pigment by the introduction of a strongly polar group, such as the carboxy group or the sulfonic acid group, may reinforce the original charge on the particles and thus maintain the good dispersion in spite of the disturbance caused by the second pigment. This is largely speculative and we do not wish to be bound in any way by any particular theory however reasonable it may appear.

Products of this invention make the Dioxazine Violet pigments useful and practical for the coloration of coating compositions, whereas the previously known pigments of this type have enjoyed no substantial use because of their severe flocculation in such compositions. Such new pigments exhibit a reddish violet hue especially valuable for shading blue pigments toward the red side without the dullness often resulting when many red pigments are used for this purpose. Furthermore, these new pigments exhibit a high degree of lightfastness and are relatively free from any tendency to bleed in oil and are thus capable of wide use.

I claim as my invention:

1. A flocculation-resistant pigment composition comprising an intimate mixture of 75% to 97% by weight of a dioxazine pigment of the formula

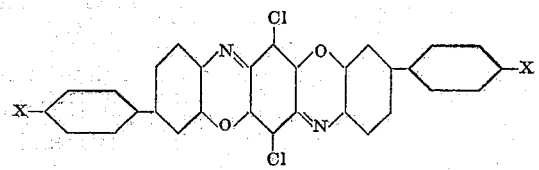

in which X is taken from a group consisting of hydrogen, and halogen substituents chlorine and bromine, together with 3% to 25% by weight of a water-insoluble polyvalent metal salt of an acid selected from the group consisting of 2,9 - diphenyl - 6,13 - dichlorotriphendioxazine monocarboxylic acid, 2,9-diphenyl-6,13-dichlorotriphendioxazine dicarboxylic acid, and 2,9-diphenyl-6,13-dichlorotriphendioxazine disulfonic acid, the polyvalent metal of said salt being a metal selected from the group consisting of calcium, barium, strontium, and aluminum.

2. The pigment composition of claim 1 in which the insoluble metal salt is the aluminum salt of 2,9-diphenyl-6,13-dichlorotriphendioxazinedisulfonic acid.

3. The pigment composition of claim 1 in which the metal salt is a salt of 2,9-diphenyl-6,13-dichlorotriphendioxazinedisulfonic acid.

4. The pigment composition of claim 1 in which the metal salt is a salt of 2,9-diphenyl-6,13-dichlorotriphendioxazine monocarboxylic acid.

5. The pigment composition of claim 1 in which the metal salt is a salt of 2,9-diphenyl-6,13-dichlorotriphendioxazine dicarboxylic acid.

6. The pigment composition of claim 1 in which the insoluble metal salt is an aluminum salt.

7. The pigment composition of claim 1 in which the insoluble metal salt is an alkaline earth metal salt.

References Cited in the file of this patent

UNITED STATES PATENTS

| | | |
|---|---|---|
| 890,254 | Ulrichs | June 9, 1908 |
| 1,868,593 | Baumann | June 26, 1932 |
| 2,402,167 | Lang et al. | June 18, 1946 |

FOREIGN PATENTS

| | | |
|---|---|---|
| 646,099 | Great Britain | Nov. 15, 1950 |